(12) United States Patent  (10) Patent No.: US 8,617,683 B2
Johnson  (45) Date of Patent: Dec. 31, 2013

(54) DECORATIVE ACCESSORY

(76) Inventor: Aubren M. Johnson, Draper, UT (US)

( * ) Notice: Subject to any disclaimer, the term of this patent is extended or adjusted under 35 U.S.C. 154(b) by 0 days.

(21) Appl. No.: 13/315,513

(22) Filed: Dec. 9, 2011

(65) Prior Publication Data

US 2012/0222449 A1    Sep. 6, 2012

Related U.S. Application Data

(63) Continuation-in-part of application No. 12/146,091, filed on Jun. 25, 2008, now Pat. No. 8,112,963.

(51) Int. Cl.
A44C 9/00 (2006.01)

(52) U.S. Cl.
USPC ............ 428/57; 52/698; 52/700; 52/701; 52/703; 52/713; 63/3; 63/3.1; 63/15; 63/15.1; 63/15.2; 428/53

(58) Field of Classification Search
USPC ........ 428/57, 53; 52/698, 700, 701, 703, 713; 63/1.16, 3, 3.1, 15, 15.1, 15.2
See application file for complete search history.

(56) References Cited

U.S. PATENT DOCUMENTS

| | | | |
|---|---|---|---|
| 645,307 A | 3/1900 | Allen | |
| 1,658,955 A | 2/1928 | Waldes | |
| 1,711,031 A | 4/1929 | Richards | |
| 2,151,607 A * | 3/1939 | Lovell | 63/15.3 |
| 2,172,132 A | 9/1939 | Schneible | |
| 2,887,795 A | 5/1959 | Taicher | |
| 3,179,954 A | 4/1965 | Weitzner | |
| 3,233,801 A | 2/1966 | Schulenberg | |
| 3,502,396 A | 3/1970 | Greenberg | |
| 3,528,079 A | 9/1970 | Birch | |
| 3,551,963 A | 1/1971 | Mosher, Jr. | |
| 3,601,909 A | 8/1971 | Amendola | |
| 3,708,804 A | 1/1973 | Santos | |
| 3,849,839 A | 11/1974 | Zimber | |
| 4,639,948 A | 2/1987 | Adell | |
| 4,712,319 A | 12/1987 | Goria | |
| 4,936,699 A | 6/1990 | Yoshida | |
| 5,161,390 A | 11/1992 | Sam | |
| D344,624 S | 3/1994 | Schnel | |
| 5,491,986 A * | 2/1996 | White | 63/29.1 |
| 5,673,501 A | 10/1997 | Mathews | |
| 5,785,065 A | 7/1998 | Johnson | |
| 5,803,266 A | 9/1998 | Blackwelder | |
| 5,901,381 A | 5/1999 | Nelson | |
| 6,422,177 B1 | 7/2002 | Noguero | |
| 6,568,044 B1 | 5/2003 | Kidd | |
| 6,640,464 B2 | 11/2003 | Hsin | |
| 7,178,364 B2 | 2/2007 | Shapiro | |
| D554,847 S | 11/2007 | Schmelzer | |
| 7,698,836 B2 | 4/2010 | Schmelzer | |

(Continued)

FOREIGN PATENT DOCUMENTS

CN    87200383    1/1988
CN    87205781    5/1988

(Continued)

Primary Examiner — Brent O'Hern
(74) Attorney, Agent, or Firm — Fredrikson & Byron, PA

(57) ABSTRACT

A decorative assembly and a kit for creating a plurality of decorative assemblies including at least one foundation piece, at least one fanciful element and at least one connector to couple the fanciful element to the foundation piece.

9 Claims, 3 Drawing Sheets

(56) References Cited

U.S. PATENT DOCUMENTS

| | | |
|---|---|---|
| 2006/0007668 A1 | 1/2006 | Chien |
| 2006/0016218 A1 | 1/2006 | Shapiro |
| 2007/0006502 A1 | 1/2007 | Schmelzer |
| 2007/0094776 A1 | 5/2007 | Stevens |
| 2008/0060110 A1 | 3/2008 | Schmelzer |
| 2010/0162591 A1 | 7/2010 | Schmelzer |

FOREIGN PATENT DOCUMENTS

| | | |
|---|---|---|
| CN | 2177354 | 9/1994 |
| DE | 9421419 | 1/1996 |
| EP | 1498043 | 1/2005 |

* cited by examiner

DECORATIVE ACCESSORY

PRIORITY CLAIM

This application is a continuation-in-part of U.S. Ser. No. 12/146,091 entitled "Decorative Accessory" filed Jun. 25, 2008 which is hereby incorporated in its entity by reference thereto.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION OF THE DRAWINGS

Figure 1:
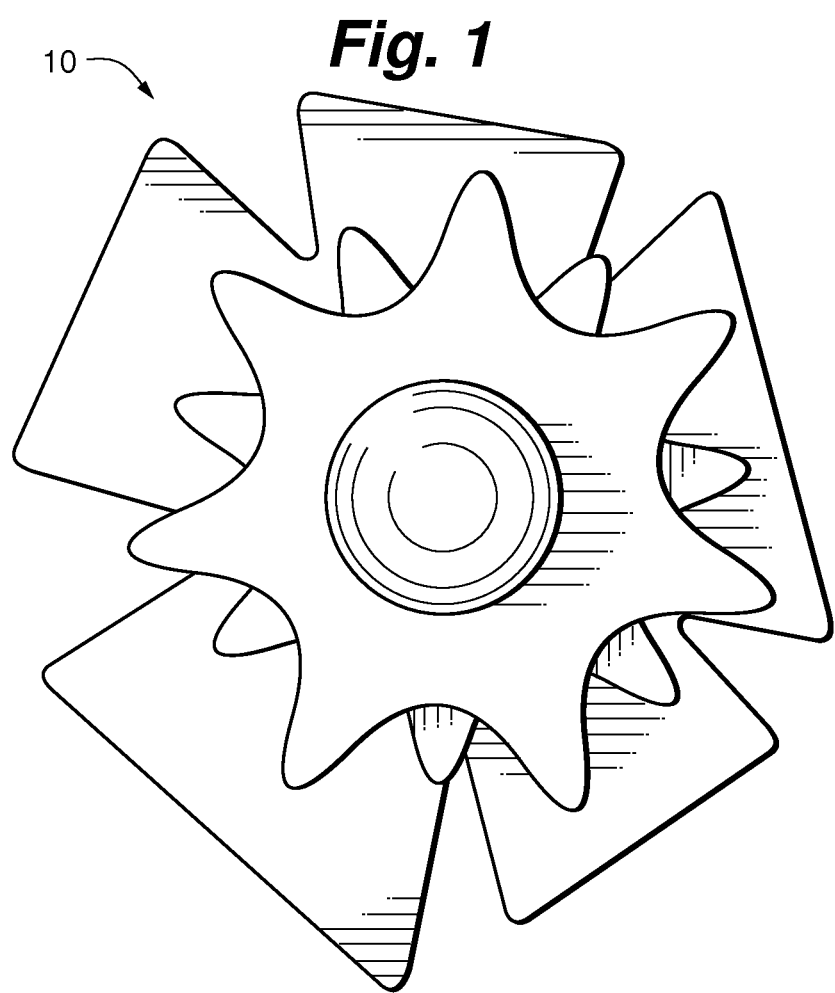
FIG. 1 is a perspective view of a decorative accessory according to a preferred embodiment of the invention in an assembled state.

For the purpose of promoting an understanding of the principles of the invention, reference will now be made to the embodiments illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein, are contemplated as would normally occur to one skilled in the art to which the invention relates.

Figure 2:
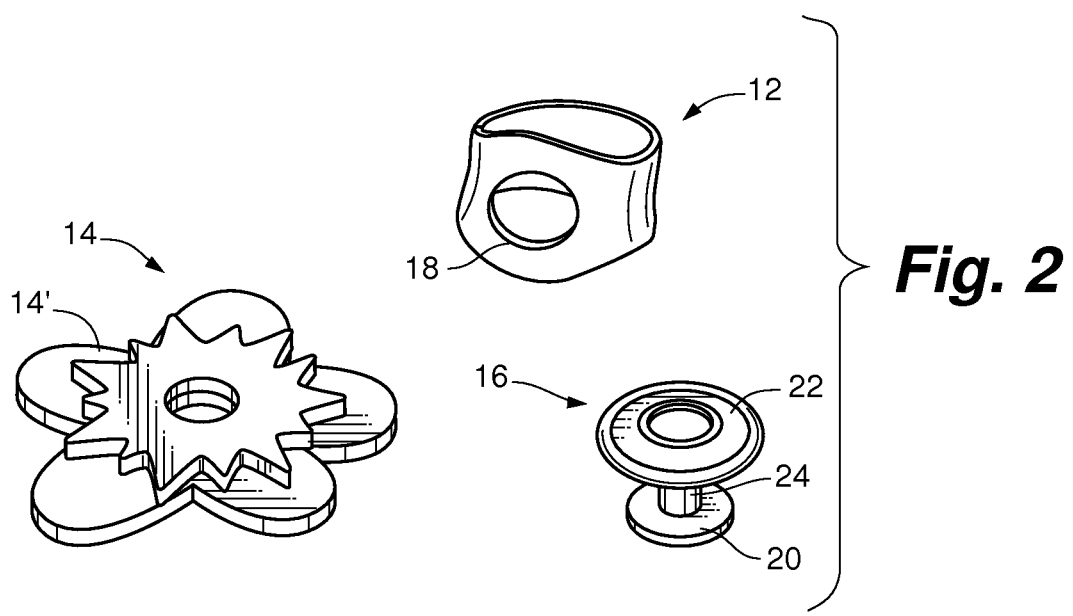
FIG. 2 is a perspective view of the decorative accessory shown in FIG. 1 in an unassembled state according to one embodiment of the invention.

FIG. 1 is a perspective view of a decorative accessory 10 according to one embodiment of the invention in an assembled state. The decorative accessory 10 is preferably a ring that can be worn on a person's digit, such as a finger (as shown) or toe. FIG. 2 is a perspective view of the decorative accessory 10 such as the one shown in FIG. 1 in an unassembled state. The accessory 10 includes a foundation piece 12, one or more fanciful elements 14, $14^1$ and a connector 16 or means for coupling the fanciful elements to the foundation piece. The foundation piece 12 is preferably made of a flexible-like and/or stretchable material such as neoprene, polychloroprene or any other synthetic rubber or silicone, for example. The foundation piece 12 has an aperture 18 therein which extends entirely through a wall of the foundation piece 12. Preferably, the aperture 18 is located at about the middle of a user's digit when the foundation piece 12 is worn.

The fanciful elements 14, $14^1$, of which two are shown, are attached to the foundation piece 12 via the connector 16 or means for coupling as will be explained. In particular, the connector 16 has a first end 20 and a second end 22 coupled together by a shank 24. The connector 16 or means for coupling may be formed as a unitary structure or it can be formed of a plurality of pieces that are coupled together such as by a bayonet coupling. The connector 16 or means for coupling may be made of plastic or metal and may be of any color. The fanciful elements 14, $14^1$ are preferably also made of a flexible-like and/or stretchable material like the foundation piece 12. Each element 14, $14^1$ has an aperture therethrough of about the same size as the aperture 18 in the foundation piece 12. The number of fanciful elements used in a decorative accessory is selectable by a user. For example, there may be more than two fanciful elements used in a decorative accessory or there may only be one. The fanciful elements 14, $14^1$ may have any shape and be of any color. Preferably, one fanciful element is stacked or layered on top of another as shown in FIG. 1. Because the foundation piece 12 and fanciful elements 14, $14^1$ are made of a flexible-like and/or stretchable material, the diameter of the aperture 18 in the foundation piece 12 and those in the fanciful elements 14, $14^1$ can be enlarged to pass one end 20 of the connector 16 therethrough, as will be described hereinafter. Once that one end of the connector 16 is passed through the apertures, the diameter of the aperture 18 and the apertures in the fanciful elements 14, $14^1$ revert back to their original shape and diameter thereby holding the connector 16 in place. When the connector 16 or means for coupling couples the fanciful elements 14, $14^1$ to the foundation piece 12, the end 20 is on an interior of the side wall of the foundation piece (i.e., adjacent a user's digit when the decorative assembly is in use) and the second end 22 of the connector is on an exterior side of the outermost fanciful element so that it is exposed to the environment when the decorative assembly is worn.

The second end 22 of the connector may have a shape such as a circle, as shown, or other shape such as a star, for example. In addition, the exterior surface of the second end 22 (i.e., that which is exposed to the environment when the decorative assembly is worn) may have details as well.

Figure 3:
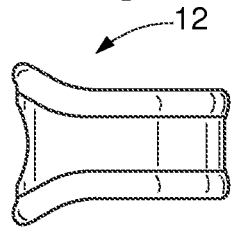
FIG. 3 is a side elevation view of the foundation piece of a decorative accessory shown in FIG. 1.
Figure 4:
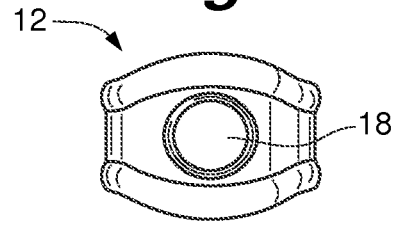
FIG. 4 is a front elevation view of the foundation piece shown in FIG. 3.

FIG. 3 is a side elevation view of the foundation piece 12 shown in FIG. 2. The exterior shape of the foundation piece 12 may take many forms and that illustrated is but one example. FIG. 4 is a front elevation view of the foundation piece 12 shown in FIG. 3.

The user creates a unique design for the decorative accessory. In this particular example shown in FIGS. 1 and 2, two fanciful elements 14, $14^1$ are used as well as a particular connector 16 that has a particular color and decorative second end 22.

As previously mentioned, the fanciful elements 14, $14^1$ may have many shapes and colors as may the exterior surface of the second end 22 of the connector 16. In addition, the exterior surface of the second end 22 of the connector 16 may have jewels or rhinestones, for example, coupled thereto.

Figure 5:
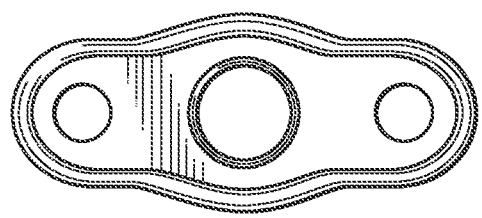
FIG. 5 is a front elevation view of the foundation piece shown in FIG. 3 in its unmolded state.
Figure 6:
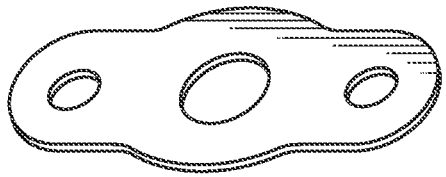
FIG. 6 is a rear elevation view of the foundation piece shown in FIG. 5 in its unmolded state.

FIG. 5 is a front elevation view of the foundation piece 12 in an unmolded state. FIG. 6 is a rear elevation view of the foundation piece 12 shown in FIG. 5. The foundation piece 12 can be made from the body 105 described in U.S. Ser. No. 12/146,091 which is incorporated herein by reference. The body is preferably placed in a mold and the two ends of the body are joined together by melting or welding, for example. Alternatively, the foundation piece 12 can be formed in a mold to have the shape shown in FIG. 2.

In some embodiments, the foundation piece 12 and the fanciful elements 14, $14^1$ comprise the same material. For example, they may comprise ethylene vinyl acetate (EVA) foam. However, in other embodiments they may comprise different materials. In general, the foundation piece 12 comprises a flexible, stretchable material, such as an injectable soft plastic such as LDPE or PVC. The fanciful elements 14, 14¹ comprise a stretchable material such as EVA foam or rubber.

As previously mentioned, the second end 22 of each connector 16 can be a generally planar or non-planar surface of a variety of standard or custom shapes. For example, it can be circular, heart-shaped, football-shaped, or rectangular, for example. Appropriately sized second ends are broad enough so as not to slip through the apertures in the foundation piece and fanciful elements, yet small enough so as not to distract from design features of the decorative accessory unit. For example, the connector's second end can be larger than 0.5 square cm and less than 4 square centimeters (e.g. 1 square cm). In various embodiments, the second end can include design features. For example, a relief design or drawing, for example, the stitches on a football shaped second end. Moreover, a team logo, company name, image, or other design may be printed, etched, engraved, molded, painted, or otherwise displayed on the second end. In addition, the second end can be flat or it may have a three-dimensional shape such as the surface of ornament. The connectors may be provided with light emitting elements and/or sound emitting elements, for example, to further enhance the design and its versatility. Scratch and sniff elements may also be incorporated into the connectors, foundation piece and/or fanciful elements.

It should be recognized that the embodiments of FIGS. 1-6 merely represent examples of foundation pieces, fanciful elements and connectors within the scope of the invention and these examples are by no means meant to be exclusive and/or exhaustive. One of ordinary skill will recognize numerous other designs, configurations, and combinations, all of which should be considered within the scope of invention.

In addition, the connector 16 may be an ornament such as those commercially available under the trade names Jibbitz™, Snap-Itz™ or Shoe-Doodles™ that have been used as accessories installable within, for example, CROCS™ shoes. Such ornaments can be installed within the aperture of the fanciful elements and foundation piece much as they would be installed within an aperture of a bracelet or shoes. Other ornaments can include plastic jewels, charms, pins, buttons, and other decorative accessories.

The decorative assembly 10 can be used by a user to create craft projects. The user can selectively choose a foundation piece from among a plurality of foundation pieces, a connector or means for coupling among a plurality of connectors or means for coupling and as many fanciful elements as she would like and then connects or couples the elements as described above. In this manner, a user can create an assembly of their own personal design and can change that design at will.

According to another aspect of the invention, a kit including a plurality of foundation pieces, connectors and/or ornaments, and fanciful elements (collectively referred to here as elements) can be provided. Kits can include a number of elements sufficient for creating one or more decorative assemblies. A kit generally includes a variety of elements so that the user has a choice of elements to use. Some kits comprise elements having a common theme. Such themes can be, for example, color-based, subject-based, or demographically oriented. For example, a demographically themed kit can include decorative accessory elements relating to a particular age group, such as young children can be grouped. Ornaments can be included in kits, and/or may be made separately available. Moreover, users can acquire ornaments currently available and adapt them for use with embodiments of the invention.

While dimensional information has been provided, the embodiments of the invention are not limited to those specifically stated and the various pieces may be larger or smaller than those described.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations, which fall within the spirit and broad scope of the invention.

What is claimed is:

1. A decorative accessory comprising:
   a foundation piece comprising a cylindrical body with an open first end and an open second end, opposite the first end, so that the foundation piece can be worn on a user's digit, the foundation piece having an aperture through a side wall; and
   at least one generally planar fanciful element having an aperture therethrough wherein the at least one generally fanciful element is placed on the foundation piece so that the aperture in the fanciful element overlies the aperture in the foundation piece; and
   a connector having a first end and a second end connected to each other by a shank wherein the first end is slightly larger than the apertures in the at least one fanciful element and foundation piece, wherein the first end extends through the apertures in the planar fanciful element and the foundation piece so that the first end is on an inner surface of the side wall of the foundation piece facing the user's digit when the foundation piece is worn and the second end of the connector is exposed through the aperture in the at least one fanciful element thereby coupling the at least one fanciful element to the foundation piece.

2. The decorative accessory of claim 1, wherein the connector is decorative.

3. The decorative accessory of claim 1, wherein the foundation piece and at least one fanciful element comprise the same material.

4. The decorative accessory of claim 3, wherein the material is ethylene vinyl acetate foam.

5. A kit for creating a plurality of decorative assemblies comprising:
   a plurality of foundation pieces, each of the plurality of foundation pieces comprising a cylindrical body with an open first end and an open second end, opposite the first end, so that each of the plurality of foundation pieces can be worn on a user's digit, each foundation piece having an aperture through a side wall;
   a plurality of generally planar fanciful elements each having an aperture therethrough wherein each of the plurality of generally planar fanciful elements can be placed on a foundation piece so that the aperture in the fanciful elements overlies the aperture in the foundation piece; and
   a plurality of connectors, each of the plurality of connectors having a first end and a second end connected to each other by a shank wherein the first end is slightly larger than the apertures in the foundation pieces and fanciful elements, wherein the first end extends through the apertures in the planar fanciful element and the foundation piece so that the first end of one of the plurality of connectors is on an inner surface of the side wall of one of the plurality of the foundation pieces facing the user's digit when the foundation piece is worn and the second end of the one connector is exposed through the aperture in the fanciful element thereby coupling at least one fanciful element to the one foundation piece.

6. The kit according to claim 5 further comprising an aperture in at least some of the connectors.

7. The kit according to claim 5 wherein the connectors are decorative.

8. The kit according to claim 5 wherein the foundation pieces and the fanciful elements comprise the same material.

9. The kit according to claim 8 wherein the material is ethylene vinyl acetate foam.

* * * * *